(No Model.)
J. HOTTINGER.
MACHINE FOR DESCRIBING OR CUTTING ELLIPSES.
No. 288,810. Patented Nov. 20, 1883.
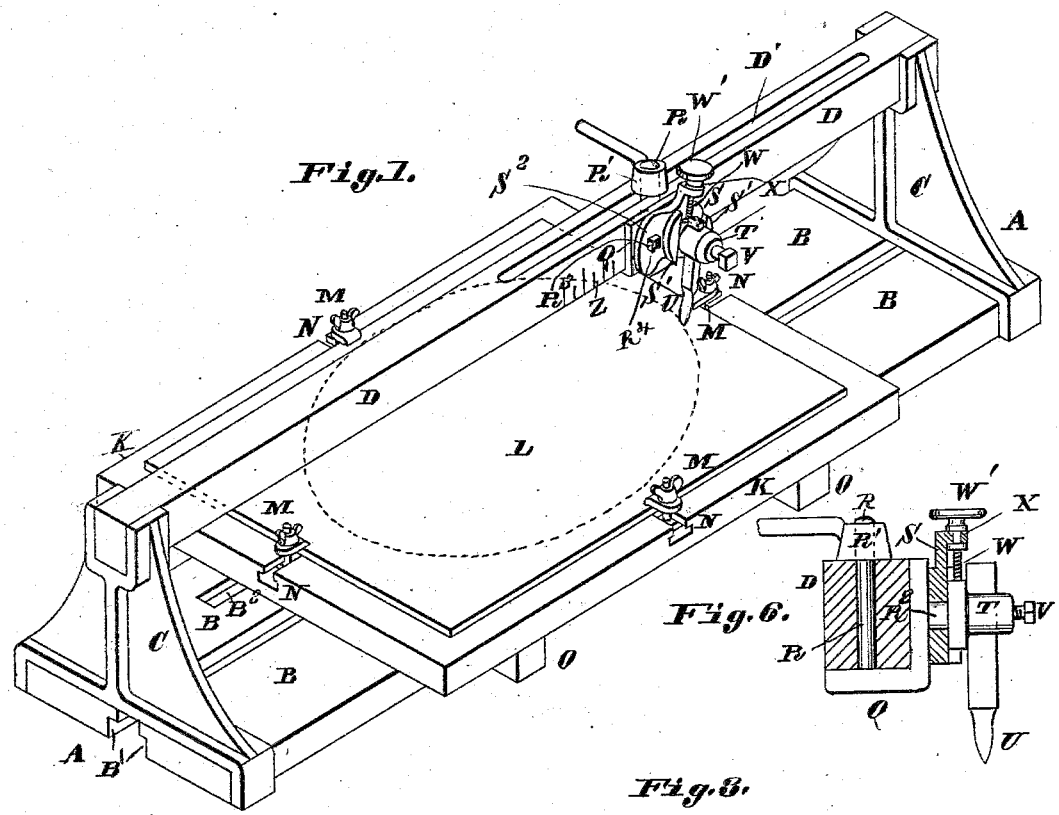
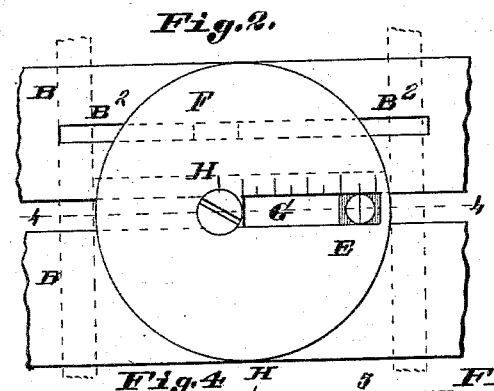
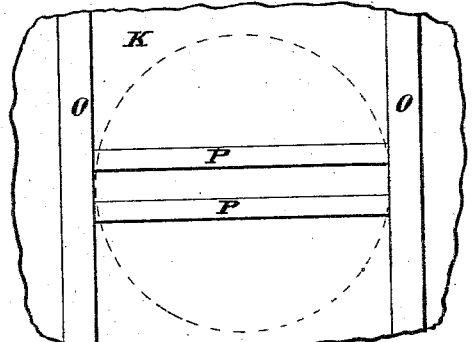
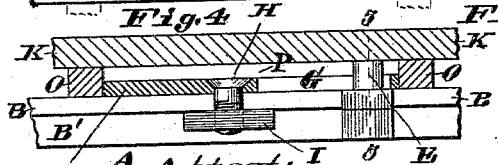
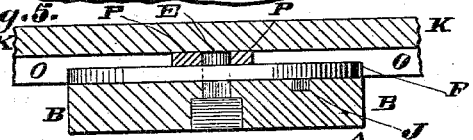

UNITED STATES PATENT OFFICE.

JOHN HOTTINGER, OF ST. LOUIS, MISSOURI.

MACHINE FOR DESCRIBING OR CUTTING ELLIPSES.

SPECIFICATION forming part of Letters Patent No. 288,810, dated November 20, 1883.

Application filed February 28, 1883. (No model.)

*To all whom it may concern:*

Be it known that I, JOHN HOTTINGER, of the city of St. Louis, in the State of Missouri, have invented a certain new and useful Machine for Describing or Cutting Ellipses, of which the following is a full, clear, and exact description, reference being had to the accompanying drawings, forming part of this specification.

My invention consists in a specific and useful construction of such machines, hereinafter described, and pointed out in the claims.

Figure 1 is a perspective view of the machine. Fig. 2 is a detail top view with the moving table removed. Fig. 3 is a detail bottom view of the moving table. Fig. 4 is a section at 4 4, Fig. 2. Fig. 5 is a section at 5 5, Fig. 4. Fig. 6 is an enlarged detail section, showing construction of tool-holding device.

A is the bed, which may be supported on legs of its own, or be supported on a bench, and having two parallel bars, B B, forming a flat platform for the table to rest on, serving to secure together the two uprights or standards C C, that support the rail D, carrying the tool.

E is an upright pivot-pin fixed between the bars B and extending above the top of the same.

F is a circular plate or block resting upon the top of the bars B, and being slotted radially at G to receive the pivot-pin E. Thus the block F has capacity for longitudinal movement along the bars B.

H is a screw-bolt whose head may be flush with the top of the block, and which is shown with a notch for the engagement of a screw-driver.

I is a nut in which the screw H turns, and which fits the ⊥-space between the bars framed by rabbet-grooves B' made in the inner edges of the bars B. When the screw is loose in the nut, the block may be moved longitudinally on the bars B, and when the screw is made tight in the nut the block is held fast. The block F is prevented from turning on the screw H by a pin, J, on its under side, that works in a longitudinal channel, B², in one of the bars B.

K is a horizontal movable table adapted to be readily lifted on and off the bars on which it is placed. This is the frame upon which is fixed the object L upon which the ellipse is to be described, or from which an elliptical sheet or block is to be cut. The object may be fixed to the table in any suitable manner. I show screw-clamps M, adjustable in ⊥-channels N of the table. The table has upon its under side two parallel trammel-bars, O O, whose distance asunder equals the diameter of the block F, and which have constant bearing upon the edge of the block. Thus, supposing that the bars O extend transversely to the block, the table is restrained from longitudinal movement upon the block; but these bars allow it unlimited transverse movement. The transverse movements of the table are governed by the parallel bars P P, set at right angles with the bars O, and whose distance asunder equals the diameter of pivot-pin E, that occupies the slot between the bars. Where the block F is fixed so that the pin E is near its center, the ellipse will be nearly circular; but where the pin is at a distance from the center of the block, the larger diameter of the ellipse is increased proportionally. Thus, if the block is so placed that the center of the pin E is three and one-half inches from the center of the block, the larger diameter of the ellipse will exceed the smaller diameter seven inches. In point of fact, the smaller diameter is diminished by the eccentricity of the pin, supposing the cutting-tool to be in the position shown.

In cutting or marking an ellipse, as the case may be, the point of the tool or marker is set one-half of the desired smaller diameter from the center of the fixed pivot-pin E. Then the block F is moved so that its center is from the center of the pin E one-half the excess of the larger diameter of the ellipse over the smaller diameter. The block F is then locked fast, and the table with the object attached put in position. The point of the tool or marker is then brought down on the object and the table turned to cut or describe the ellipse.

I will now describe the device shown for holding the tool or marker, but will say that the construction of this device admits of great variation.

Q is an adjustable bracket clamped to the bar D by a screw, R, extending through a longitudinal slot, D', in the bar, and having a nut, R', bearing upon the top of the bar.

S is a guide-plate turnable on a pivot-pin, R², extending from the face of the bracket, and having guide-bars S', in which works the tool-holder T.

U is the tool or marker passing through the tool-holder and held by a set-screw, V, in a usual manner. The cutting or marking tool or pencil U may be set vertical or at any desired inclination by turning the guide-plate on the pivot R², and this plate is locked in position by a screw bolt or bolts, R³, extending from the bracket Q through slot or slots S² in the guide-plate, and having nut or nuts R⁴ bearing upon the guide-plate.

It is required that the cutting-tool U shall have capacity for downward feed in the direction in which the downward cut is made, and for this purpose I provide a feed-screw, W, that turns in a lug, X, of the guide-plate, and has collars bearing against the top and bottom of the lug. This screw screws in the tool-holder T. W' is a hand-wheel, by which the feed-screw is turned.

Z is a scale on bar D, to indicate the distance of the tool U from pin E.

The tool or marker U may be duplicated; or there may be more than two, to describe or cut as many concentric ellipses.

Steam or treadle power may be used to turn table K and feed-screw W.

My device, though embodying as part thereof a frame having trammel-bars working on the face and periphery of a circular adjustable block, which is old *per se*, is differently arranged, being mounted horizontally instead of vertically, and thereby dispensing with the supports necessary to a vertically-mounted frame. My aim has been to simplify the construction and bring the table or frame on which the object is mounted into a more convenient and desirable position, where it can have a firm and solid support, and be readily lifted on and off the bars on which it is placed and on which it merely rests without fastening. The tool can be more easily adjusted, being over the table instead of at one side thereof. The ease in adjusting to different proportions is an advantage in my device, as by merely loosening a screw and adjusting the bracket to a scale marked to indicate the difference between the transverse and conjugate diameters, the change in the position of the tool is accomplished.

I claim—

1. In a machine for describing and cutting ellipses, the combination of horizontal bed A, having flat parallel bars B B, to form a platform, leaving a ⊥-slot between them, a circular plate, F, having radial slot G, and adjustable longitudinally on the bars, the screw-bolt H, and nut I, occupying the ⊥-slot to hold the circular plate to its adjustment longitudinally, upright stationary pivot-pin E, projecting through the radial slot and secured to the bed in line with the ⊥-slot, and a table, K, provided with trammel-bars O on its under side, to bear upon the periphery of the circular plate and the platform, and having other trammel-bars, P, transverse of the plate trammel-bars, to bear on the circular plate and to form a slot to receive the upper end of the pivot-pin, whereby the table K is removably connected to the plate and pin, as set forth.

2. In a machine for cutting and describing ellipses, the combination of horizontal bed A, to form a platform, standards C, one at each end of the bed, rail D, mounted on said uprights, having slot D' and scale Z, a tool-bracket adjustable on said rail, having a bolt occupying the slot, and a nut to hold the bracket to its adjustment, a circular plate, F, having a radial slot and secured to the bed, a fixed upright pivot-bolt secured to the bed, projecting through the radial slot, and a table, K, provided with trammel-bars O and P on its under side, to play around the circular plate and pivot-pin, respectively, as set forth.

3. In a machine for describing and cutting ellipses, the combination, with a suitable bed, table, and slotted rail, of the tool device herein described, consisting of bracket Q, having lateral pin R², a vertical bolt, R, and nut R', to secure the bracket to the rail, a guide-plate, S, to turn on the pivot-pin, having guide-bars S', lug X, and slot S², screw-bolt R³, and nut R⁴, to lock the guide-plate to its adjustment, tool-holder T, to slide between the guide-bars, screw-bolt W, working through the lug to adjust the holder, and a tool or marker adjustable in said holder by means of a set-screw, V, as set forth.

JOHN HOTTINGER.

Witnesses:
SAML. KNIGHT,
ALBERT G. FISH.